R. A. SMITH.
DUMPING CART.
No. 44,983. Patented Nov. 8, 1864.
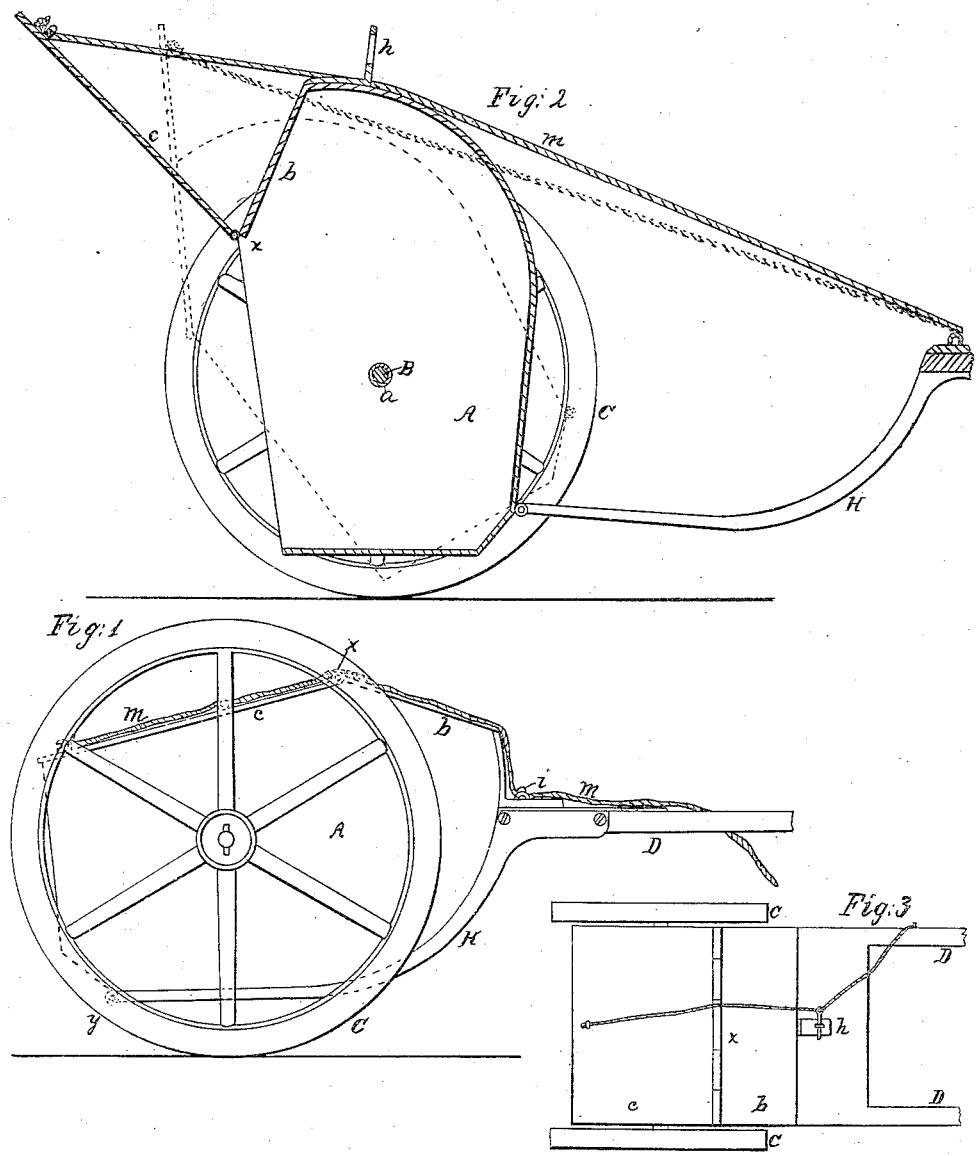

UNITED STATES PATENT OFFICE.

R. A. SMITH, OF PHILADELPHIA, PENNSYLVANIA.

IMPROVEMENT IN DUMPING-CARTS

Specification forming part of Letters Patent No. 44,983, dated November 8, 1864; antedated October 25, 1864.

*To all whom it may concern:*

Be it known that I, R. A. SMITH, of Philadelphia, Pennsylvania, have invented an Improved Dumping-Cart; and I do hereby declare the following to be a full, clear, and exact description of the same.

My improved dumping-cart consists of a body formed, hung to the wheels, and connected to the shafts, all substantially as described hereinafter, so that the body of the cart may be turned and its contents discharged by a forward movement of the horse, and without any exertion on the part of the attendant, the cart being simple in construction and not liable to leak or scatter its contents.

In order to enable others to make and use my invention, I will now proceed to describe its construction and operation.

On reference to the accompanying drawings, which form a part of this specification, Figure 1 is a side view of my improved dumping-cart; Fig. 2, a transverse sectional elevation, and Fig. 3 a plan view drawn to a reduced scale.

Similar letters refer to similar parts throughout the several views.

A represents the body of the cart; B, the axle, which passes through the body and through a tube, $a$, within the same, C C being suitable wheels arranged to turn freely one in each projecting end of the axle.

It will be observed that the body of the cart is of a peculiar form, the flat bottom meeting the rounded front, the rear being straight, and the top consisting of two portions, $b$ and $c$, the former of which constitutes a permanent part of the body, the latter being a lid hinged at $x$, and serving to cover the only opening through which the load is deposited in the body of the cart, and through which it is discharged from the same. D D are the two shafts, to the rear of which are secured two bars, H, bent to the form of the body, and hinged to the latter at the point $y$. It should be understood that the portion of the body in front of the axle preponderates, and therefore tends of itself to take a position on the curved bars H H. In front of the body is a slotted projection, $h$, which rests on the rear of the shafts, a staple on the latter passing through the slot, and a pin passing through the staple, thereby locking the body of the cart to the shafts. One end of a cord or chain, $m$, is secured to the lid $c$ near the rear of the same, the other end being secured to a pin or projection on one of the shafts. Prior to loading the cart the body is locked to the shafts, and the lid $c$ raised by means of the cord $m$, when the garbage or other material can be readily deposited on the body. When the cart has to be unloaded, the pin is withdrawn from the staple and the horse started at a quick pace for a short distance. This movement will cause the body of the cart to turn on the axle and to assume the position shown by red lines, Fig. 2, when the entire contents of the body are at once discharged, owing to its peculiar form. As the body is in the act of being turned, the cord or chain causes the lid to open, and finally arrests the turning of the body beyond the position which is most available for the discharge of the load. On backing the horse, the body of the cart will be restored to its proper position to be locked to the shaft as before.

My improved dumping-cart possesses several advantages, which may be described as follows: First, it is cheap and simple as regards construction; second, the body of the cart is perfectly tight and free from all openings, saving that required for the introduction and discharge of the load, and is consequently less liable to leak and scatter its contents than the garbage-carts usually employed; third, no exertion is required on the part of the attendant for the purpose of turning the body of the cart.

I claim as my invention and desire to secure by Letters Patent—

The body A, formed, hung to the wheels, and connected to the shaft, all substantially as and for the purpose herein set forth.

In testimony whereof I have signed my name to this specification in the presence of two subscribing witnesses.

R. A. SMITH.

Witnesses:
 C. E. FOSTER,
 JOHN WHITE.